United States Patent
DiDonato

(10) Patent No.: US 6,333,060 B1
(45) Date of Patent: Dec. 25, 2001

(54) TUNA TWISTER

(76) Inventor: Maureen DiDonato, 1 W. Loudoun St., Suite 6, Box 427, Round Hill, VA (US) 20142

( * ) Notice: Subject to any disclaimer, the term of this patent is extended or adjusted under 35 U.S.C. 154(b) by 0 days.

(21) Appl. No.: 09/384,338

(22) Filed: Aug. 27, 1999

Related U.S. Application Data

(60) Provisional application No. 60/098,294, filed on Aug. 27, 1998.

(51) Int. Cl.[7] ............................. A23L 1/325; B65D 85/16; B65D 85/72
(52) U.S. Cl. ......................... 426/115; 426/112; 426/129; 426/394; 426/478
(58) Field of Search .................................. 426/106, 112, 426/115, 123, 129, 495, 478, 489, 490, 394, 410, 413, 402; 210/513, 514; 99/495, 506, 508

(56) References Cited

U.S. PATENT DOCUMENTS

| | | | |
|---|---|---|---|
| 672,994 | * | 4/1901 | Wacker .......................... 426/112 X |
| 2,052,941 | * | 9/1936 | Prevost ................................ 210/514 |
| 2,428,429 | * | 10/1947 | McNeill .............................. 210/514 |
| 3,040,897 | * | 6/1962 | Holman ............................ 426/112 X |
| 3,995,544 | * | 12/1976 | Farley ............................... 99/495 X |
| 5,320,031 | * | 6/1994 | Whitney ................................ 99/495 |
| 5,363,759 | * | 11/1994 | D'Ambrosio ...................... 99/495 X |
| 5,372,063 | * | 12/1994 | Berg ................................... 99/506 X |
| 5,470,601 | * | 11/1995 | Robertson ........................ 426/112 X |
| 5,501,144 | * | 3/1996 | Bryson .............................. 99/508 X |
| 5,706,721 | * | 1/1998 | Homes ................................... 99/495 |
| 6,068,870 | * | 5/2000 | Strauss ............................ 426/495 X |

* cited by examiner

Primary Examiner—Arthur L. Corbin
(74) Attorney, Agent, or Firm—James Creighton Wray; Meera P. Narasimhan

(57) ABSTRACT

The present invention provides a container for packaging solid food that is stored in the container in a liquid environment, such as tuna fish. One end of the container has a foraminous drain lid for draining the liquid from the container. The drain lid may have a rim to prevent a user from being splashed while draining the contents of the container. The container is sealed to prevent contamination of the contents of the container. The container may be made of a flexible material so that the user may squeeze the container to facilitate draining the liquid from the container. Once the liquid has been drained from the container, the drain lid is removed to allow extraction of the solid food from the container.

27 Claims, 2 Drawing Sheets

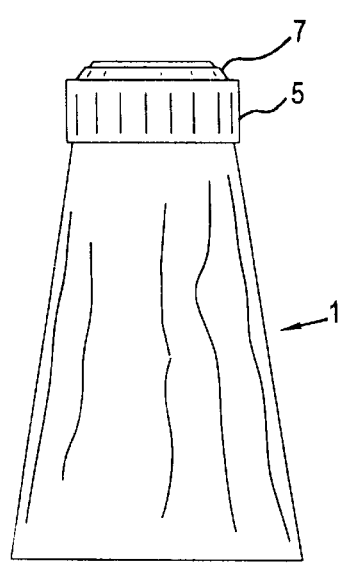
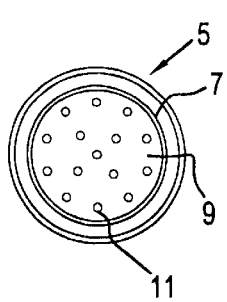
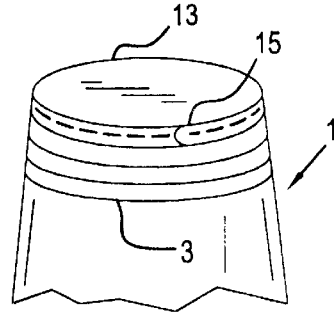
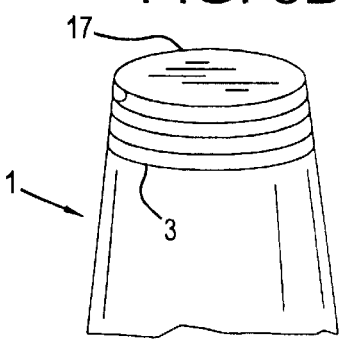
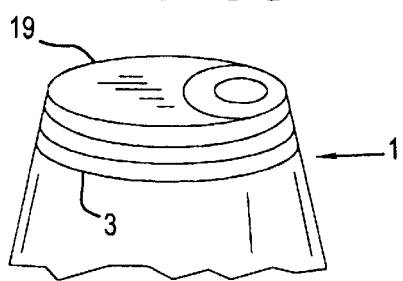
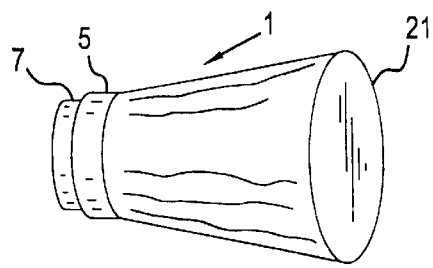
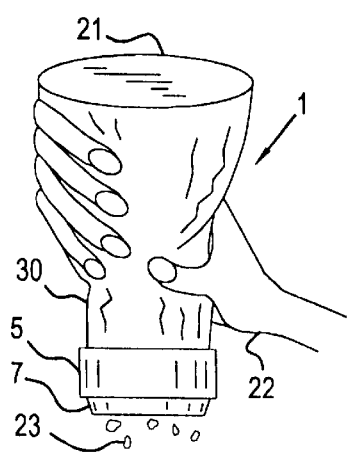
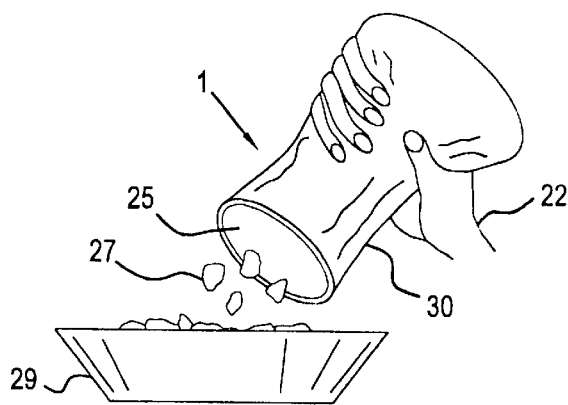

TUNA TWISTER

This application claims the benefit of U.S. Provisional Application No. 60/098,294, filed Aug. 27, 1998.

BACKGROUND OF THE INVENTION

The metal cans currently used to package tuna are difficult to open. Once opened, the cans are difficult to work with and are potentially unsafe. The edges of the opened container and the lid are sharp and jagged, which increases the chances of cutting yourself while handling the container. Since there is no easy way to drain the liquid in which the tuna is packed, there is a danger of spreading bacteria due to the draining liquid contaminating other food items. Preparing tuna packaged in the current containers is awkward, messy, and time consuming, as well as odorous. A need exists for tuna packaging that eliminates these problems.

SUMMARY OF THE INVENTION

The present invention is for tuna packaging to replace the metal cans currently used for tuna packaging. The present invention is made from a heavy pliable plastic type material that may be foil lined. The plastic or like material is similar to some of the more pliable type toothpaste packaging currently used, or the plastic or thick vinyl packaging currently used for some orange juice containers.

An upper portion of the container has external threads for receiving a twist style drain lid. The container is sealed, preferably by a plastic tab cover that has a heat-sealed tear-off tab. The seal may also be a tear-off foil seal or a safety metal pop-top lid. The drain lid is removed from the container to access the seal. Once the seal is removed, the drain lid is replaced on the container. The container is then held upside-down and the liquid that the tuna is packaged in may be squeezed out of the container through the drain lid. When the liquid has been drained from the container, the drain lid is removed and the tuna may be shaken out of the container.

In another embodiment, the container seal covers the drain lid. Once this outer seal is removed, the liquids may be removed from the container. The drain lid may be secured to container by a heat-sealed plastic tear-off tab.

The entire tuna package may be shrink-wrapped as an additional safety feature.

The packaging is for one-time use for storing tuna. The packaging may be made from recyclable materials, so that once the tuna is used the entire package may be rinsed and then recycled.

The present invention provides tuna packaging that is much more attractive to consumers than the current metal cans. The present invention makes tuna preparation and clean-up easier, safer, quicker and more pleasant overall. The present invention may be used to replace all current tuna packaging in the commercial food industry, whether it is for consumer use at home or for use by restaurants and other institutions that use tuna in food preparation.

These and further and other objects and features of the invention are apparent in the disclosure, which includes the above and ongoing written specification, with the claims and the drawings.

BRIEF DESCRIPTION OF THE DRAWINGS

FIG. 1 is a front view of the present invention.

FIG. 2 is a bottom view of the top drain lid.

FIGS. 3A, 3B and 3C are perspective views of the present invention with a plastic tab cover to seal the container, with a foil seal cover to seal the container, and with a safety metal pop-top lid to seal the container.

FIG. 4 is a perspective view of the present invention showing a round, flat base.

FIG. 5 is a front view showing liquids being squeezed out of the tuna container.

FIG. 6 is a perspective view showing tuna being removed from the drained container.

DETAILED DESCRIPTION OF THE PREFERRED EMBODIMENTS

Figure 7:
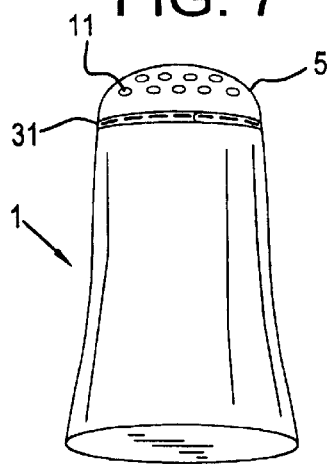
FIG. 7 is a perspective view of a tuna container with a built-in drain lid.

The present invention is tuna packaging made from a heavy pliable plastic type material that may be foil lined. The plastic or like material is similar to some of the more pliable type toothpaste packaging currently used, or the plastic or thick vinyl packaging currently used for some orange juice containers.

A preferred embodiment of the container 1 is shown in FIG. 1. An upper portion of the container has external threads 3, shown in FIGS. 3A, 3B and 3C, for receiving a twist style drain lid 5. FIG. 2 shows a top view of the drain lid 5. The lid 5 has a splash-guard inner rim 7 that prevents splashing of the liquids onto the user while draining the liquids. The top 9 of the drain lid 5 has holes 11 through which the dispensed liquids exit the container 1. As shown in FIG. 4, the container 1 may have a round, flat base 21 for storing the container upright.

As shown in FIG. 3A, the container is sealed, preferably by a plastic tab cover 13 that has a heat-sealed tear-off tab 15. The seal may also be a tear-off foil seal 17 (FIG. 3B) or a safety metal pop-top lid 19 (FIG. 3C). The drain lid 5 is removed from the container 1 to access the seal 13. Once the seal is removed, the drain lid 5 is replaced on the container 1. The container 1 is then held upside-down by a user 22, as shown in FIG. 5, so that the liquid 23 may be drained from the container 1. Squeezing the sides 30 of the container 1 forces the liquid 23 out of the container 1 through the holes in the drain lid 5. When the liquid has been drained from the container, the drain lid 5 is removed, leaving an opening 25 in the container 1. A user 22 may then shake or squeeze the tuna 27 out of the container 1 and into a bowl 29 for preparation.

Figure 8:
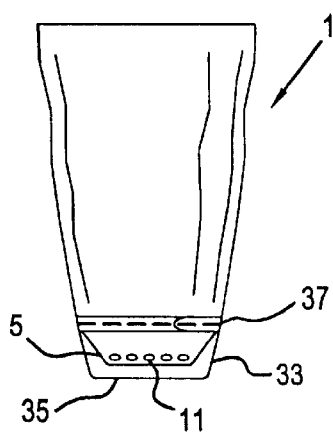
FIG. 8 is a front view of a tuna container with a clear top and a heat-sealed tear-off plastic tab.

In another embodiment, shown in FIG. 7, the drain lid 5 is attached to the container 1 by a heat-sealed plastic tear-off tab 31. An outer seal 33 covers the drain lid 5. Preferably, the outer seal 33 is a heat-sealed plastic tab or a pop-top style lid. FIG. 8 shows a seal 33 with a flat surface 35 for storing the container 1 upside down to facilitate draining of the liquids. An outer heat-sealed plastic tear-off tab 37 secures the seal 33 to the container 1. Once this outer seal 33 is removed, the liquids may be removed from the container 1.

Figure 9A:
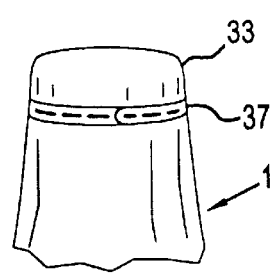
FIGS. 9A, 9B, 9C, 9D, and 9E show the steps of removing tuna from the container.
Figure 9B:
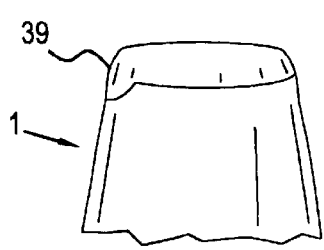
Figure 9C:
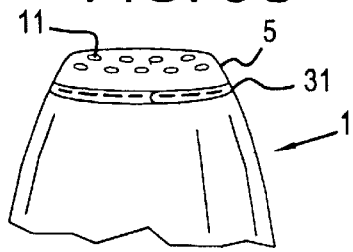
Figure 9D:
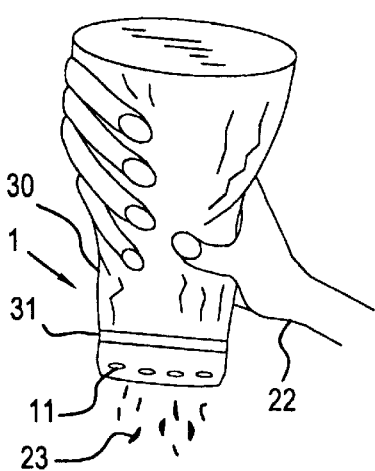
Figure 9E:
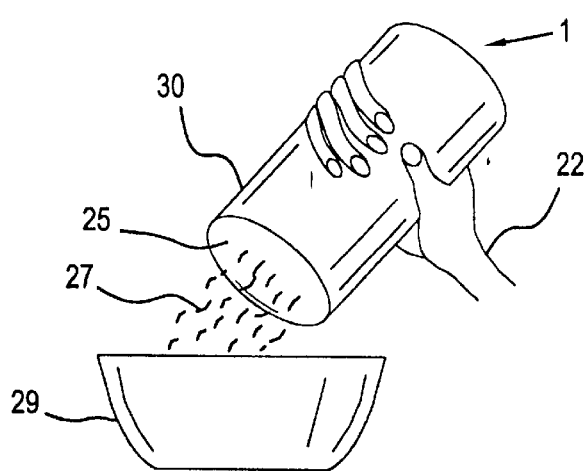

FIGS. 9A–9E show the steps involved to remove tuna from the container 1. Referring to FIG. 9A, the outer tab 37 is removed in order to release the seal 33. FIG. 9B shows the drain lid protected by a seal 39. Preferably, the seal 39 is a foil seal. Removing the drain lid seal 39 exposes the drain lid 5, as shown in FIG. 9C. FIG. 9D shows the liquid 23 being drained from the container 1 through holes 11 in the drain lid 5 due to a user 22 squeezing the sides 30 of the container. Once the liquid has been drained, the tab 31 securing the drain lid 5 to the container 1 is removed exposing opening 25 in the container 1. As shown in FIG. 9E, the tuna 27 is then shaken or squeezed through the opening 25 in the container 1 into a receiving dish 29 for preparation.

The entire tuna package may be shrink-wrapped as an additional safety feature.

The packaging is for one-time use for storing tuna. The packaging may be made from recyclable materials, so that once the tuna is used the entire package may be rinsed and then recycled.

The present invention provides tuna packaging that is much more attractive to consumers than the current metal cans. The present invention makes tuna preparation and clean-up easier, safer, quicker and more pleasant overall. The present invention may be used to replace all current tuna packaging in the commercial food industry, whether it is for consumer use at home or for use by restaurants and other institutions that use tuna in food preparation.

While the invention has been described with reference to specific embodiments, modifications and variations of the invention may be constructed without departing from the scope of the invention, which is defined in the following claims.

I claim:

1. A solid tuna food product package, comprising a squeezable pliable foil-lined plastic body for packaging of a solid tuna food product and packing liquid, the solid tuna food product and packing liquid disposed in the body, the body having flexible sides and first and second ends, the second end being removable from the body, the second end having a foraminous cap for separating the packing liquid from the tuna food product, and the second end being detachable for forming an open end of the body for removal of the solid tuna food product from the body through the open end.

2. The package of claim 1, further comprising:
a cover connected to the open end of the body for sealing the open end.

3. The package of claim 2, wherein the cover is connected to the open end under a foraminous cap.

4. The package of claim 2, wherein the cover is connected to the open end over a foraminous cap.

5. The package of claim 4, further comprising:
a primary seal extending across the open end under the foraminous cap.

6. The package of claim 2, wherein the cover comprises a plastic strip with a terminal pull tab extending around the open end.

7. The package of claim 2, wherein the cover comprises a foil seal, with a pull tab, extending over the open end.

8. The package of claim 2, wherein the cover comprises a safety metal pop top lid, with a pull tab, extending over the open end.

9. The package of claim 2, wherein the open end of the body and the foraminous cap further comprise threads for securing the foraminous cap to the open end of the body.

10. The package of claim 1, further comprising:
a rim extending from the open end and around a foraminous cap for holding the container on end to promote draining of the packing liquid and for preventing sideways spraying of the drained liquid.

11. The package of claim 1, wherein the foraminous cap is strapped onto the open end.

12. A tuna package, comprising a flexible wall container made from a pliable squeezable foil-lined plastic material, the container having flexible side walls and first and second ends, the second end being openable for forming a closed first end and an open second end, tuna and packing liquid disposed in the container, the second end being openable for draining packing liquid from the tuna in the container through holes in a drain lid attached to the second end, and the second end being detachable and removable from the container for removing the tuna through the open end of the container.

13. The tuna package of claim 12, further comprising:
a cap connected to the open end of the container; and
a seal connected to the open end of the container and to the cap for sealing the tuna and the liquid in the container.

14. The package of claim 13, wherein the seal is positioned over the cap.

15. The package of claim 13, wherein the seal is positioned under the cap.

16. The package of claim 13, wherein the seal is positioned over and under the cap.

17. The package of claim 13, wherein the cap is surrounded by a rim for preventing sideways expulsion of the liquid.

18. The package of claim 12, wherein the open end of the container further comprise threads for securing a cap to the open end of the container.

19. A method of providing a container of solid tuna food product, comprising providing a flexible wall container made from a pliable squeezable foil-lined plastic material, the container having flexible side walls and first and second ends, the second end being removable for forming a closed first end and an open second end, disposing solid tuna food product and a packing liquid in the container, opening the second end of the container, draining the packing liquid from the container through holes in a drain lid attached to the second end, and removing the second end of the container, flexing the walls of the container, and emptying the solid tuna food product from the container.

20. The method of claim 19, wherein the draining further comprises squeezing the flexible wall.

21. The method of claim 19, wherein the second end has an encircling rim and wherein the draining further comprises preventing sideways expulsion of the liquid with the rim.

22. The method of claim 19, wherein removing of the second end comprises lifting a tab and providing a flat cover along an edge of the second end.

23. The method of claim 19, wherein removing of the second end comprises lifting a tab and pulling a strip from around an edge of the second end.

24. The method of providing a container of solid tuna food product, comprising providing a flexible wall container made from a pliable squeezable foil-lined plastic material, the container having flexible side walls and first and second ends, the second end being removable for forming a closed first end and an open second end, disposing solid tuna food product and a packing liquid in the container, removing the second end of the container thereby forming the open second end, inverting the container, draining the packing liquid from the solid tuna food product in the container through holes in a drain lid attached to the second open second end of the container, and emptying the solid tuna food product from the container through the open second end.

25. The method of claim 24, wherein the second end has an encircling rim and wherein the draining further comprises preventing sideways expulsion of the liquid with the rim.

26. The method of claim 24, wherein removing of the second end comprises lifting a tab and providing a flat cover along an edge of the second end.

27. The method of claim 24, wherein removing of the second end comprises lifting a tab and pulling a strip from around an edge of the second end.

* * * * *